United States Patent
Blondel et al.

(10) Patent No.: US 9,346,953 B2
(45) Date of Patent: *May 24, 2016

(54) SEMI-AROMATIC-POLYAMIDE-BASED FLEXIBLE COMPOSITION, PROCESS FOR PREPARING SAME AND USES THEREOF

(71) Applicant: ARKEMA FRANCE, Colombes (FR)

(72) Inventors: Philippe Blondel, Bernay (FR); Christophe Caremiaux, Cesseville (FR)

(73) Assignee: ARKEMA FRANCE, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/351,640

(22) PCT Filed: Oct. 8, 2012

(86) PCT No.: PCT/FR2012/052276
§ 371 (c)(1),
(2) Date: Apr. 14, 2014

(87) PCT Pub. No.: WO2013/054026
PCT Pub. Date: Apr. 18, 2013

(65) Prior Publication Data
US 2014/0246096 A1    Sep. 4, 2014

(30) Foreign Application Priority Data

Oct. 13, 2011 (FR) .................... 11 59261
Feb. 17, 2012 (FR) .................... 12 51460

(51) Int. Cl.
| | | |
|---|---|---|
| C08L 77/00 | (2006.01) | |
| C08L 77/06 | (2006.01) | |
| B32B 27/34 | (2006.01) | |
| B32B 1/08 | (2006.01) | |
| C08L 23/08 | (2006.01) | |
| C08L 33/06 | (2006.01) | |
| F16L 9/12 | (2006.01) | |
| B32B 27/22 | (2006.01) | |
| B32B 27/30 | (2006.01) | |

(52) U.S. Cl.
CPC . *C08L 77/06* (2013.01); *B32B 1/08* (2013.01); *B32B 27/22* (2013.01); *B32B 27/308* (2013.01); *B32B 27/34* (2013.01); *C08L 23/0869* (2013.01); *C08L 23/0884* (2013.01); *C08L 33/064* (2013.01); *F16L 9/12* (2013.01); *B32B 2270/00* (2013.01); *B32B 2307/306* (2013.01); *B32B 2307/538* (2013.01); *B32B 2307/546* (2013.01); *B32B 2307/558* (2013.01); *B32B 2307/714* (2013.01); *B32B 2597/00* (2013.01); *B32B 2605/08* (2013.01); *C08L 33/068* (2013.01); *C08L 2205/22* (2013.01); *Y10T 137/0318* (2015.04)

(58) Field of Classification Search
None
See application file for complete search history.

(56) References Cited

U.S. PATENT DOCUMENTS

| | | | |
|---|---|---|---|
| 6,864,318 B2 | 3/2005 | Bouilloux et al. | |
| 8,748,004 B2 * | 6/2014 | Briffaud et al. | ............ 428/474.4 |
| 2003/0008976 A1 | 1/2003 | Bouilloux et al. | |
| 2011/0206881 A1 | 8/2011 | Briffaud et al. | |
| 2012/0202896 A1 | 8/2012 | Blondel et al. | |

FOREIGN PATENT DOCUMENTS

| | | |
|---|---|---|
| EP | 1505099 A2 | 2/2005 |
| WO | 2011015790 A2 | 2/2011 |

OTHER PUBLICATIONS

International Search Report for PCT/FR2012/052276 dated Feb. 8, 2013.
English Abstract of EP1505099, Publication date: Feb. 9, 2005.

\* cited by examiner

*Primary Examiner* — Ana Woodward
(74) *Attorney, Agent, or Firm* — Millen, White, Zelano and Branigan, P.C.

(57) ABSTRACT

The present invention relates to a composition comprising: from 33 to 40% by weight of at least one crosslinked polyolefin obtained from at least one product (A) comprising an unsaturated epoxide and from at least one product (B) comprising an unsaturated carboxylic acid anhydride, from 3 to 10% by weight of at least one plasticizer, the rest being made up of at least one semi-aromatic polyamide, wherein the weight contents of (A) and (B), denoted respectively [A] and [B], are such that the [B]/[A] ratio is between 3 and 14. The present invention also relates to a process for preparing such a composition and also to the uses thereof.

21 Claims, No Drawings

SEMI-AROMATIC-POLYAMIDE-BASED FLEXIBLE COMPOSITION, PROCESS FOR PREPARING SAME AND USES THEREOF

The present invention relates to a flexible composition comprising at least one semiaromatic polyamide, at least one crosslinked polyolefin, and at least one plasticizer, to a process for preparing it, and to its uses, especially in the manufacture of various objects, such as current consumer goods as for instance electrical, electronic, or automotive equipment, surgical apparatus, packaging, or else sports articles.

THE PRIOR ART AND THE TECHNICAL PROBLEM

In the automotive industry, for example, compositions based on one or more semiaromatic polyamides are seeing increasing use, owing to the noteworthy thermomechanical properties that such compositions confer on components produced from them.

For optimum adaptation of the thermomechanical properties of these components, the semiaromatic polyamide-based compositions from which these components are manufactured may comprise one or more other polymers and/or additives.

Document EP 1 505 099 A2 describes, in particular, a polyamide composition comprising from 60 to 99.5% by weight of at least one copolyamide and from 0.5 to 40% by weight of at least one product selected from plasticizers, nanofillers, polyolefins, crosslinked polyolefins, and additives, the weight amounts being given relative to the total weight of the composition. This composition is described as being a flexible composition with low water uptake, which has a superior thermomechanical performance and is easy to convert.

More particularly, looking at the tables in said document EP 1 505 099 A2, it is observed that the flexural modulus of a test specimen produced from a semiaromatic polyamide composition can be lowered by adding a plasticizer and/or a crosslinked polyolefin.

The addition of a plasticizer to a semiaromatic polyamide allows the flexural modulus to be lowered significantly. However, it is observed that, while the flexural modulus reduces in line with increased weight plasticizer content of the semiaromatic polyamide composition, there is also a proportional reduction in the low-temperature impact strength properties (as evaluated by the measurement of the Charpy impact at −40° C.). It is found, furthermore, that the higher the plasticizer content, the greater the formation of fumes during extrusion of a composition of this kind comprising a semiaromatic polyamide and a plasticizer.

The addition of a crosslinked polyolefin to a semiaromatic polyamide also allows the flexural modulus to be lowered. However, in order to reach flexural modulus values of the order of 600 to 700 MPa, it is necessary to add at minimum from 40 to 45% by weight of the total weight of the composition formed by the semiaromatic polyamide and the crosslinked polyolefin. With weight proportions of this kind, a non-nodular alloy morphology (phase inversion) is obtained which rules out the conversion of such a composition by extrusion. Obtaining an extruded tube is therefore impossible.

The addition of a crosslinked polyolefin and of a plasticizer to a semiaromatic polyamide is an alternative route which also permits a very significant lowering of the flexural modulus. There again, however, it is observed that the low-temperature impact strength properties are not satisfactory.

Moreover, in order to enhance these low-temperature mechanical properties, an aliphatic polyamide is added, the effect of which is to stiffen the material.

Accordingly there is a genuine need to find new compositions that allow the production of components exhibiting in combination:
 a very good high-temperature strength, particularly at service temperatures of at least 160° C.,
 a very good aging resistance, which may in particular be evaluated by thermooxidative measurements to determine the time taken for the elongation at break of samples to reduce by half,
 very good mechanical properties, more particularly a low-temperature impact strength as manifested by a Charpy impact value at −40° C. of at least greater than or equal to 7 kJ/m, this value being measured in accordance with standard ISO 179-1eA, and
 a flexural modulus of less than or equal to 800 MPa, advantageously less than or equal to 700 MPa, and, preferably, less than or equal to 600 MPa, this modulus being measured in accordance with standard ISO 178-93.

Furthermore, all of the properties which have just been listed must not be achieved at the expense of a conversion process by extrusion, coextrusion, or extrusion-blow molding. In other words, the aim is to obtain extruded (coextruded or extrusion-blow molded) components, more particularly tubes, whose inner and outer surfaces have a uniform and smooth appearance. The reason is that an irregular appearance to these outer surfaces of the extruded tubes may have detrimental consequences for the mechanical properties of the tubes.

A further aim is to prevent the formation of fumes during this conversion step.

BRIEF DESCRIPTION OF THE INVENTION

Surprisingly, the applicant has found that this dual need, in terms of properties and of conversion, is achieved by a composition of the aforementioned type, namely a composition comprising at least one semiaromatic polyamide, at least one plasticizer, and at least one crosslinked polyolefin, the crosslinked polyolefin being obtained from at least one product (A) comprising an unsaturated epoxide and from at least one product (B) comprising an unsaturated carboxylic anhydride.

According to the invention, the composition comprises the following respective weight proportions of the compounds which have just been cited, the weight percentages being given relative to the total weight of the composition:
 from 33 to 40% by weight of at least one crosslinked polyolefin as defined above,
 from 3 to 10% by weight of at least one plasticizer, and
 the rest being made up of at least one semiaromatic polyamide,
with weight amounts of (A) and (B), written respectively as [A] and [B], such that the ratio [B]/[A] is between 3 and 14.

By virtue of this specific selection of respective weight proportions of crosslinked polyolefin(s), plasticizer(s), and semiaromatic polyamide(s), on the one hand, and of weight amounts of (A) and (B), on the other hand, the composition according to the invention produces components which exhibit noteworthy thermomechanical and flexibility properties. Such components, when obtained by extrusion, have the advantage, moreover, of having smooth outer surfaces. During this conversion step, there is little or no deposition on the screw and/or on the extrusion die, also referred to as "die drool", and this represents an advantage for the production of the tubes and the upkeep of the extrusion equipment.

The invention also relates to a process for preparing the composition, and to its uses, particularly as a constituent layer of a structure which may be single-layer or multilayer.

The invention relates, lastly, to a component formed entirely or partly from a composition of the invention, and also to the uses of such a component.

DETAILED DESCRIPTION OF THE INVENTION

Further features, aspects, objectives, and advantages of the present invention will emerge more clearly from a reading of the description and examples which follow.

The nomenclature used in defining the polyamides is described in standard ISO 1874-1:1992 *"Plastics—Polyamide (PA) molding and extrusion materials—Part 1: Designation"*, particularly on page 3 (tables 1 and 2), and is well known to the skilled person.

It should also be noted that the expressions "between . . . and . . . " and "from . . . to . . . " that are used in the present description should be understood as including each of the stated endpoints.

The Semiaromatic Polyamide

The composition of the invention comprises at least one semiaromatic polyamide.

This semiaromatic polyamide comprises at least one first repeating semiaromatic unit which is obtained from the polycondensation of a diamine and an aromatic dicarboxylic acid.

The diamine comprises advantageously between 4 and 36 carbon atoms.

The diamine may be selected from aliphatic diamines, cycloaliphatic diamines, and alkylaromatic diamines. These diamines may be linear. They may also be branched and may comprise at least one alkyl branch on the main chain, and this alkyl branch may itself be linear or branched.

When the diamine is aliphatic and linear, it conforms to the formula $H_2N-(CH_2)_x-NH_2$. It may therefore be selected from butanediamine (x=4), pentane-diamine (x=5), hexanediamine, also called hexamethylenediamine (x=6), heptanediamine (x=7), octanediamine (x=8), nonanediamine (x=9), decanediamine (x=10), undecanediamine (x=11), dodecanediamine (x=12), tridecanediamine (x=13), tetradecanediamine (x=14), hexadecanediamine (x=16), octadecanediamine (x=18), octadecenediamine (x=18), eicosanediamine (x=20), docosanediamine (x=22), and the diamines obtained from fatty acids. Diamines of these kinds all have the advantage that they may be biobased and include organic carbon from biomass, as may be determined in accordance with standard ASTM D6866.

When the diamine is cycloaliphatic, it may be selected from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-amino-cyclohexyl)butane, bis(3-methyl-4-aminocyclohexyl)methane (BMACM or MACM), p-bis(aminocyclohexyl)-methane (PACM) and isopropylidenedi(cyclohexylamine) (PACP). The cycloaliphatic diamine may also include the following carbon skeletons: norbornylmethane, cyclohexylmethane, dicyclohexylpropane, di(methylcyclohexyl), di(methylcyclohexyl)propane. A nonexhaustive list of these cycloaliphatic diamines is given in the publication "Cycloaliphatic Amines" (Encyclopaedia of Chemical Technology, Kirk-Othmer, 4th Edition (1992), pp. 386-405).

When the diamine is alkylaromatic, it may be selected from 1,3-xylylene diamine and 1,4-xylylene diamine.

Advantageously, the diamine is an aliphatic diamine.

Preferedly, the diamine is a linear aliphatic diamine.

The aromatic dicarboxylic acid may be selected from terephthalic acid (coded T), isophthalic acid (coded I), phthalic acid, and naphthalene acids. The aromatic dicarboxylic acids which have just been cited may also include one or more alkyl branches, and these alkyl branches may themselves be linear or branched. Included accordingly is 2-methylterephtalic acid.

Advantageously, the semiaromatic polyamide has a melting temperature of greater than 230° C., advantageously of between 230° C. and 310° C., and more particularly of between 240° C. and 280° C.

More particularly preferedly, the aromatic dicarboxylic acid is terephthalic acid (T).

According to one particular version of the invention, the semiaromatic polyamide may comprise more than 50 mol % of first repeating unit(s), advantageously more than 60 mol %.

It is possible more particularly to consider the use of a semiaromatic polyamide composed of 100 mol % of one or more first repeating units.

More particularly, according to a first aspect of the invention, this semiaromatic polyamide may be a homopolymer composed only of first repeating units obtained from the polycondensation reaction of a diamine and an aromatic dicarboxylic acid.

Accordingly, the semiaromatic polyamide may be selected from the homopolyamides 6.T, 9.T, 10.T, 11.T, 12.T, 14.T, 18.T, 6.I, 9.I, 10.I, 11.I, 12.I, 14.I, and 18.I.

According to a second aspect of the invention, this semiaromatic polyamide may be a copolymer composed of first repeating units obtained from the polycondensation reaction of a diamine and two aromatic dicarboxylic acids, or from the polycondensation reaction of two diamines and an aromatic dicarboxylic acid.

Accordingly, in the first case, the semiaromatic polyamide may be selected from the copolyamides 6.T/6.I, 9.T/9.I, 10.T/10.I, 11.T/11.I, and 12.T/12.I. In the second case, the semiaromatic polyamide may be selected from the copolyamides 6.T/9.T, 6.T/10.T, 6.T/11.T, 6.T/12.T, 9.T/10.T, 9.T/11.T, 9.T/12.T, 10.T/11.T, 10.T/12.T, and 11.T/12.T. A similar list may be drawn up by replacing the terephthalic acid (T) with isophthalic acid (I).

According to a third aspect of the invention, this semiaromatic polyamide may be a copolymer comprising first repeating units obtained from the polycondensation reaction of at least two diamines and at least two aromatic dicarboxylic acids.

In addition to this at least one first, semiaromatic repeating unit, which has just been detailed and which is obtained from the polycondensation of a diamine and an aromatic dicarboxylic acid, the semiaromatic polyamide in the composition of the invention may also comprise at least one second repeating unit, this second repeating unit being necessarily other than the first repeating unit or units.

This second repeating unit may be selected from the group consisting of a unit obtained from an aminocarboxylic acid, a unit obtained from a lactam, and a unit conforming to the formula (Ca diamine).(Cb difunctional acid), where "a" represents the number of carbon atoms in the diamine and "b" represents the number of carbon atoms in the difunctional acid.

Advantageously, a and b are each between 4 and 36.

When this second repeating unit is obtained from an aminocarboxylic acid, this aminocarboxylic acid may be selected from 9-aminononanoic acid (9), 10-aminodecanoic acid (10), 10-aminoundecanoic acid (11), 12-aminododecanoic acid (12), and 11-aminoundecanoic acid (11). The aminocarboxylic acid may also be branched. A possible example is N-heptyl-11-aminoundecanoic acid.

When this second repeating unit is obtained from a lactam, this lactam may be selected from pyrrolidinone, 2-piperidinone, enantholactam, caprylolactam, pelargolactam, decanolactam (10), undecanolactam (11), and lauryllactam (12).

When this second repeating unit is a unit conforming to the formula (Ca diamine).(Cb difunctional acid), it is obtained from the polycondensation of a diamine, the Ca diamine, and a dicarboxylic acid, the Cb difunctional acid, with the proviso that this dicarboxylic acid is not an aromatic dicarboxylic acid.

This Ca diamine may be selected from aliphatic diamines, cycloaliphatic diamines, and alkylaromatic diamines. These Ca diamines may be linear. They may also be branched and may include at least one alkyl branch on the main chain, and this alkyl branch may itself be linear or branched.

The diamines described above for preparing the first repeating unit may also be used as Ca diamine for obtaining the second repeating unit. Reference is therefore made to the paragraphs above relating to the diamines that may be used to obtain the first repeating unit for examples of Ca diamines which may be used for producing the second repeating unit.

The dicarboxylic acid (Cb difunctional acid) employed for obtaining the second repeating unit may be selected from aliphatic dicarboxylic acids and cycloaliphatic dicarboxylic acids. These dicarboxylic acids may be linear. They may also be branched and may comprise at least one alkyl branch on the main chain, and this alkyl branch may itself be linear or branched.

When the dicarboxylic acid (Cb difunctional acid) is aliphatic and linear, it may be selected from succinic acid (4), pentanedioic acid (5), adipic acid (6), heptanedioic acid (7), octanedioic acid (8), azelaic acid (9), sebacic acid (10), undecanedioic acid (11), dodecanedioic acid (12), brassylic acid (13), tetradecanedioic acid (14), hexadecanedioic acid (16), octadecanedioic acid (18), octadecenedioc acid (18), eicosanedioic acid (20), docosanedioic acid (22), and fatty acid dimers containing 36 carbons.

The fatty acid dimers referred to above are dimerized fatty acids obtained by oligomerization or polymerization of unsaturated monobasic fatty acids with a long hydrocarbon chain (such as linoleic acid and oleic acid), as described in particular in document EP 0 471 566.

When the dicarboxylic acid (Cb difunctional acid) is cycloaliphatic, it may comprise the following carbon skeletons: norbornyl methane, cyclohexane, cyclohexylmethane, dicyclohexylmethane, dicyclohexylpropane, di(methylcyclo-hexyl), di(methylcyclohexyl)propane.

Accordingly, the second repeating unit of the semiaromatic polyamide may denote, in particular, the following units: 6, 11, 12, 6.10, 6.12, 6.14, 6.18, 10.10, 10.12, 10.14, 10.18, and 12.12.

According to a fourth aspect of the invention, this semiaromatic polyamide may be a copolymer composed of first repeating units obtained from the polycondensation reaction of a diamine and an aromatic dicarboxylic acid, and second repeating units obtained alternatively from an aminocarboxylic acid, or from a lactam, or from the polycondensation of a Ca diamine and a Cb difunctional acid as described above.

Among the combinations to which consideration may be given, the following copolyamides are of particularly marked interest: these are copolyamides conforming to one of the formulae selected from 11/6.T, 12/6.T, 6.10/6.T, 6.12/6.T, 10.10/6.T, 10.12/6.T, 12.12/6.T, 11/9.T, 12/9.T, 6.10/9.T, 6.12/9.T, 10.10/9.T, 10.12/9.T, 12.12/9.T, 11/10.T, 12/10.T, 6.10/10.T, 6.12/10.T, 10.10/10.T, 10.12/10.T, and 12.12/10.T.

According to a fifth aspect of the invention, this semiaromatic polyamide may be a copolymer comprising first repeating units obtained from the polycondensation reaction of at least one diamine and at least one aromatic dicarboxylic acid, and second repeating units obtained from at least one aminocarboxylic acid, at least one lactam, and/or from the polycondensation of a Ca diamine and a Cb difunctional acid as described above.

Among the multiplicity of combinations to which consideration may be given, mention may be made in particular of the copolyamides conforming to one of the formulae selected from:
- 6/11/10.T, 6/12/10.T, 11/12/10.T, 11/6.10/10.T, 12/6.10/10.T, 11/10.6/10.T, 12/10.6/10.T, these copolyamides all comprising a first repeating 10.T unit and two second repeating units,
- 6/6.T/10.T, 11/6.T/10.T, 12/6.T/10.T, these copolyamides all comprising two first repeating 6.T and 10.T units, and a second repeating unit,
- 11/9.T/9.I, 12/9.T/9.I, 11/10.T/10.I, 12/10.T/10.I, these copolyamides all comprising two first repeating units and a second repeating unit,
- 6/11/6.T/10.T, 11/12/6.T/10.T, these copolyamides both comprising first repeating 6.T and 10.T units, and two second repeating units.

In the context of the present invention, it is possible advantageously to use first and, where appropriate, second repeating units which are or will be obtained, entirely or partially, from diamines, dicarboxylic acids, aminocarboxylic acids and/or lactams which are biobased, in other words containing organic carbon originating from biomass, as may be determined in accordance with standard ASTM D6866.

The Crosslinked Polyolefin

The composition according to the invention comprises at least one crosslinked polyolefin, said crosslinked polyolefin being present as a phase dispersed in the matrix formed by the semiaromatic polyamide(s).

This crosslinked polyolefin originates from the reaction of two or of at least two products having groups which are reactive with one another.

More particularly, the crosslinked polyolefin is obtained from at least one product (A) comprising an unsaturated epoxide and from at least one product (B) comprising an unsaturated carboxylic anhydride.

Product (A) is advantageously a polymer comprising an unsaturated epoxide, this unsaturated epoxide being introduced into said polymer either by grafting or by copolymerization.

The unsaturated epoxide may in particular be selected from the following epoxides:
- aliphatic glycidyl ethers and esters such as allyl glycidyl ether, vinyl glycidyl ether, glycidyl maleate and itaconate, glycidyl acrylate and methacrylate, and
- alicyclic glycidyl ethers and esters such as 2-cyclohexen-1-yl glycidyl ether, diglycidyl cyclohexene-4,5-dicarboxylate, glycidyl cyclohexene-4-carboxylate, glycidyl 5-norbornene-2-methyl-2-carboxylate, and diglycidyl endo-cis-bicyclo[2.2.1]hept-5-ene-2,3-dicarboxylate.

According to a first form, the product (A) is a polyolefin grafted with an unsaturated epoxide. By polyolefin is meant a homopolymer or copolymer comprising one or more olefin units such as ethylene, propylene, but-1-ene, or any other alpha-olefin units. Examples of polyolefin include the following:

polyethylene and, in particular, low density polyethylene (LDPE), high density polyethylene (HDPE), linear low density polyethylene (LLDPE), and very low density polyethylene (VLDPE); polypropylene; ethylene/propylene copolymers; elastomeric polyolefins such as ethylene-propylene (EPR or EPM) or ethylene-propylene-diene monomer (EPDM); or else metallocene polyethylenes obtained by single-site catalysis;

styrene/ethylene-butene/styrene block copolymers (SEBS); styrene/butadiene/styrene block copolymers (SBS); styrene/isoprene/styrene block copolymers (SIS); or else styrene/ethylene-propylene/styrene block copolymers;

copolymers of ethylene and at least one product selected from salts of unsaturated carboxylic acids, esters of unsaturated carboxylic acids, and vinyl esters of saturated carboxylic acids. The polyolefin may in particular be a copolymer of ethylene and alkyl(meth)acrylate or a copolymer of ethylene and vinyl acetate.

According to a second form, product (A) is a copolymer of alpha-olefin and an unsaturated epoxide and, advantageously, a copolymer of ethylene and an unsaturated epoxide. Advantageously, the amount of unsaturated epoxide may represent up to 15% by weight of the copolymer (A), with the amount of ethylene in turn representing at least 50% by weight of the copolymer (A).

Mention may be made more particularly of copolymers of ethylene, a saturated carboxylic acid vinyl ester, and an unsaturated epoxide, and also copolymers of ethylene, an alkyl (meth)acrylate, and an unsaturated epoxide. Preferably, the alkyl(meth)acrylate comprises from 2 to 10 carbon atoms. Examples of alkyl acrylates or methacrylates which can be used are, in particular, methyl acrylate, methyl methacrylate, ethyl acrylate, n-butyl acrylate, isobutyl acrylate, and 2-ethylhexyl acrylate.

According to one advantageous version of the invention, product (A) is a copolymer of ethylene, methyl acrylate, and glycidyl methacrylate, or a copolymer of ethylene, n-butyl acrylate, and glycidyl methacrylate. It will be possible in particular to use the product sold by Arkema under the name Lotader® AX8900.

According to another form of the invention, product (A) is a product having two epoxide functions, such as, for example, the diglycidyl ether of bisphenol A (DGEBA).

Product (B) is advantageously a polymer comprising an unsaturated carboxylic anhydride, this unsaturated carboxylic anhydride being introduced into said polymer either by grafting or by copolymerization.

Examples of unsaturated dicarboxylic anhydrides which can be used as constituents of product (B) are, in particular, maleic anhydride, itaconic anhydride, citraconic anhydride, and tetrahydrophthalic anhydride.

According to a first form, product (B) is a polyolefin grafted with an unsaturated carboxylic anhydride. As was seen above, a polyolefin is a homopolymer or copolymer comprising one or more olefin units such as ethylene, propylene, but-1-ene, or any other alpha-olefin units. This polyolefin may in particular be selected from the examples of polyolefins listed above for product (A), when the latter is a polyolefin grafted with an unsaturated epoxide.

According to a second form, product (B) is a copolymer of alpha-olefin and of an unsaturated carboxylic anhydride, and, advantageously, a copolymer of ethylene and an unsaturated carboxylic anhydride. Advantageously, the amount of unsaturated carboxylic anhydride may represent up to 15% by weight of the copolymer (B), with the amount of ethylene itself representing at least 50% by weight of the copolymer (B).

Mention may be made more particularly of copolymers of ethylene, a saturated carboxylic acid vinyl ester, and an unsaturated carboxylic anhydride, and also of copolymers of ethylene, an alkyl(meth)acrylate, and an unsaturated carboxylic anhydride. Preferably, the alkyl(meth)acrylate comprises from 2 to 10 carbon atoms. The alkyl acrylate or methacrylate may be selected from those cited above for product (A).

According to one advantageous version of the invention, product (B) is a copolymer of ethylene, an alkyl(meth)acrylate, and an unsaturated carboxylic anhydride. Preferably, product (B) is a copolymer of ethylene, ethyl acrylate, and maleic anhydride, or a copolymer of ethylene, butyl acrylate, and maleic anhydride. It will in particular be possible to use the products sold by Arkema under the names Lotader® 4700 and Lotader® 3410.

It would not be a departure from the scope of the invention if a part of the maleic anhydride in the product (B), according to the first and second forms described above, was partly hydrolyzed.

According to the invention, the weight amounts of product (A) and of product (B), which are written respectively as [A] and [B], are such that the ratio [B]/[A] is between 3 and 14 and, advantageously, between 4 and 9.

In the composition according to the invention, the crosslinked polyolefin may also be obtained from products (A) and (B) as described above and from at least one product (C), this product (C) comprising an unsaturated carboxylic acid or an alpha,omega-aminocarboxylic acid.

Product (C) is advantageously a polymer comprising an unsaturated carboxylic acid or an alpha,omega-aminocarboxylic acid, with one or other of these acids being introduced into said polymer by copolymerization.

Examples of unsaturated carboxylic acids which can be used as constituents of product (C) are, in particular, acrylic acid, methacrylic acid, and the carboxylic anhydrides cited above as constituents of product (B), these anhydrides being completely hydrolyzed.

Examples of alpha,omega-aminocarboxylic acids which can be used as constituents of product (C) are, in particular, 6-aminohexanoic acid, 11-amino-undecanoic acid, and 12-aminododecanoic acid.

Product (C) may be a copolymer of alpha-olefin and an unsaturated carboxylic acid, and, advantageously, a copolymer of ethylene and an unsaturated carboxylic acid. Included in particular are the completely hydrolyzed copolymers of product (B).

According to one advantageous version of the invention, product (C) is a copolymer of ethylene and (meth)acrylic acid, or a copolymer of ethylene, an alkyl(meth)acrylate, and (meth)acrylic acid. The amount of (meth)acrylic acid may represent up to 10% by weight and, preferably, from 0.5 to 5% by weight of the copolymer (C). The amount of alkyl(meth) acrylate is generally between 5 and 40% by weight of the copolymer (C).

Preferably, product (C) is a copolymer of ethylene, butyl acrylate, and acrylic acid. It will be possible in particular to use the product sold by BASF under the name Lucalene® 3110.

According to the invention, the weight amounts of product (A), of product (B), and of product (C), which are written respectively as [A], [B] and [C], are such that the ratio [B]/([A]+[C]) is between 1.5 and 8, the weight amounts of products (A) and (B) being such that [C] 5 [A].

Advantageously, the ratio [B]/([A]+[C]) is between 2 and 7.

The dispersed crosslinked polyolefin phase may of course come from the reaction of one or more products (A) with one or more products (B) and, where appropriate, with one or more products (C).

It is possible to use catalysts which accelerate the reaction between the reactive functions of the products (A) and (B). Reference may be made, in particular, to the teaching of document WO 2011/015790 with regard to examples of catalysts, which may be used in a weight amount of between 0.1 and 3% and, advantageously, between 0.5 and 1% of the total weight of the products (A), (B) and, where appropriate, (C).

The Plasticizer

The composition according to the invention comprises at least one plasticizer.

This plasticizer may be a plasticizer commonly used in polyamide-based compositions.

Advantageously, a plasticizer is used which exhibits high thermal stability so as not to form fumes during steps of mixing of the various polymers and of converting of the resulting composition.

More particularly, this plasticizer may be selected from:
benzenesulfonamide derivatives such as n-butylbenzenesulfonamide (BBSA), the ortho and para isomers of ethyltoluenesulfonamide (ETSA), N-cyclohexyltoluenesulfonamide, and N-(2-hydroxypropyl)benzene-sulfonamide (HP-BSA),
esters of hydroxybenzoic acids, such as 2-ethylhexyl para-hydroxybenzoate (EHPB) and 2-decylhexyl para-hydroxybenzoate (HDPB),
esters or ethers of tetrahydrofurfuryl alcohol, such as oligoethyleneoxy-tetrahydrofurfuryl alcohol, and
esters of citric acid or of hydroxymalonic acid, such as oligoethyleneoxy malonate.

A plasticizer which is preferred on account of its common use is n-butyl-benzenesulfonamide (BBSA).

Another, more particularly preferred plasticizer is N-(2-hydroxypropyl)-benzenesulfonamide (HP-BSA). The reason is that the latter has the advantage of preventing the formation of deposits at the screw and/or the extrusion die ("die drool"), during a step of conversion by extrusion.

It is, of course, possible to use a mixture of plasticizers.

The composition according to the invention comprises, relative to the total weight of the composition:
from 33 to 40%, advantageously from 35 to 37%, by weight of at least one crosslinked polyolefin as described above,
from 3 to 10%, advantageously from 4 to 8%, by weight of at least one plasticizer, and
the rest being made up of at least one semiaromatic polyamide.

This composition may be solely composed of these three classes of compounds, namely at least one crosslinked polyolefin, at least one plasticizer, and at least one semiaromatic polyamide.

However, the composition may also comprise other compounds in addition to those which have just been cited. The composition of the invention may, in particular, further comprise at least one additive and/or at least one further polymer.

The Additives

The composition of the invention may further comprise at least one additive as well.

This additive may in particular be selected from processing aids, fillers, stabilizers (UV and/or heat), dyes, mold release agents, flame retardants, surfactants, optical brighteners, antioxidants, and mixtures thereof.

Among the processing aids, mention may be made of stearates, such as calcium or zinc stearates, natural waxes, and polymers comprising tetrafluoroethylene (TFE).

The weight proportion of processing aids is conventionally between 0.01 and 0.3% by weight, advantageously between 0.02 and 0.1% by weight, relative to the total weight of the composition.

The fillers include silica, graphite, expanded graphite, carbon black, carbon fibers, glass beads, kaolin, magnesia, slags, talc, nanofillers (carbon nanotubes), pigments, metal oxides (titanium oxide), metals, and fibers (aramids, glass, carbon).

Depending on the nature of the fillers, the amount thereof may represent up to 50% by weight, advantageously, up to 30% by weight, of the total weight of the composition.

The Further Polymers

A composition in accordance with the invention may further comprise one or more further polymers, and in particular at least one third polymer, such a polymer being different from the semiaromatic polyamide(s) and from the crosslinked polyolefin(s) referred to above.

Advantageously, this further polymer may in particular be selected from a polyamide, a polyamide-block-ether, a polyetheramide, a polyesteramide, a polyphenylene sulfide (PPS), a polyphenylene oxide (PPO), a noncrosslinked polyolefin (in contrast to the crosslinked polyolefin considered above), a fluoropolymer, and mixtures thereof. With regard to the noncrosslinked polyolefins, mention may be made of the polyolefins described in the section on "the crosslinked polyolefin", in other words products (A), (B), or (C), which are in that case used alone so as not to crosslink, it being noted that these noncrosslinked polyolefins are known, moreover, as impact modifiers.

The further polymer may likewise be selected from starch, which may be modified and/or formulated, cellulose or its derivatives, such as cellulose acetate or cellulose ethers, polylactic acid, polyglycolic acid, and polyhydroxyalkanoates.

Preferably, the further polymer is selected from aliphatic polyamides and polyamide-block-ethers. The aliphatic polyamides include, in particular, long-chain polyamides such as PA11, PA12, PA6.10, PA6.12, PA6.14, PA10.10, PA10.12, and PA12.12.

The composition may therefore contain up to 20% by weight, relative to the total weight of the composition, of at least one further polymer.

The invention also relates to a process for preparing a composition as defined above. According to this process, the composition may be prepared by any method allowing a homogeneous mixture to be obtained, such as extrusion in the melt state, compacting, or else roll milling.

More particularly, the composition of the invention may be prepared by mixing in the melt state the semiaromatic polyamide(s), the plasticizer(s), and the products (A), (B), and optionally (C) for producing the crosslinked polyolefin(s).

The optional additives and/or further polymers may for their part be introduced either at the same time as the semiaromatic polyamide(s), plasticizer(s), and products (A), (B), and, where appropriate, (C), or in a subsequent step.

Advantageously, the composition may be obtained in pellet form by compounding, in particular by means of a twin-screw extruder, a co-kneading apparatus, or an internal mixer. These pellets of the composition according to the invention obtained by the above-described preparation process may subsequently be converted using tools known to the skilled person (such as an injection molding machine or an extruder) to the form of filaments, tubes, films and/or moldings.

The process for preparing the composition of the invention may also use a twin-screw extruder which, without intermediate pelletizing, feeds an injection molding machine or an extruder for the production of filaments, tubes, films and/or moldings.

The invention therefore also relates to a material or article obtained from a composition as defined above by a known conversion process such as injection molding, extrusion, extrusion-blow molding, coextrusion, or multiple injection.

The invention likewise relates to the use of a composition as described above for forming a structure.

This structure may be single-layer when formed only from the composition of the invention.

This structure may also be multilayer, when it comprises at least two layers and when at least one of these different layers is composed of the composition of the invention. According to one advantageous variant, this multilayer structure may be reinforced and may comprise at least one layer composed of a braid or of fibers.

The invention likewise relates to a component formed wholly or partly from the composition of the invention. This component may comprise the immediately aforementioned single-layer or multilayer structure. Such a component may in particular be an injection molded component and, more particularly, an extruded, coextruded, or extrusion-blow molded component. It may in particular take the form of a tube, a pipe, a reservoir, fibers, a film, a sheet, or a plate.

The invention relates, lastly, to the use of such a component for storing or conveying a fluid. A fluid of this kind may in particular be selected from a fuel (such as gasoline, without or without alcohol, or diesel or biodiesel), a refrigerant or refrigerating fluid (such as, for example, $CO_2$ or a fluorocarbon fluid such as 1,1,1,2-tetrafluoroethane or 2,3,3,3-tetrafluoropropene, respectively, as commonly designated by the name R-134a or R-1234yf, used in particular in air conditioning circuits, conditioned-air circuits, or refrigeration circuits), a cooling liquid (such as a solution based on alcohol and/or water that may be used in the cooling circuit of engines), a brake fluid, an oil, a lubricant, a hydraulic fluid, a liquid based on urea solution, a chemical product, water, or else a gas (such as air, alkanes, hydrogen, or carbon dioxide) or gaseous emanations or vapors (originating, for example, from the engine), which gas may be at overpressure or at underpressure.

The component formed wholly or partly from the composition of the invention may in particular be used for producing all or part of components of surgical equipment, packaging, or sports or leisure articles. This component may also be used for producing all or part of elements of electrical and electronic goods, such as solar panels, encapsulated solenoids, roll cages, pumps, multimedia systems, cables, and wires. More particularly, the cables and wires may be covered with a layer formed from the composition of the invention, which thus constitutes a thermal protection sheath.

This component comprising the composition of the invention may advantageously be used for producing some or all of industrial equipment items for the storage, transport, or transfer of fluids such as those listed above, more particularly of hot fluids such as air, oil, lubricants, hydraulic fluids, or else petroleum and compounds thereof. Such equipment may be intended for use in the field of industry in general (for example, for pneumatic or hydraulic lines) and in the field of the exploitation of petroleum and gas deposits beneath the sea (offshore field).

This component comprising the composition according to the invention may very advantageously be used for producing all or part of automobile or truck equipment items. Such items may in particular be tubes, tube connectors, pumps, or underhood injection molded components.

More particularly, these automobile or truck equipment items, especially when present in the form of tubes and/or connectors, may be used in particular:

in a device for circulating gas, at overpressure or underpressure, such as an air intake device or engine gas ventilation device, or a braking assistance device, in a device for circulating oil or lubricant, such as an oil cooling device, a hydraulic device, or a braking device, in a device for circulating aqueous or nonaqueous liquid, such as an engine cooling device or a selective catalytic reduction device, in a device for circulating refrigerant or refrigerating fluid, such as an air conditioning circuit, in a device for storage, transport, or transfer (or circulation) of fluids, more particularly of fuels.

Such items may of course be made antistatic or conducting, by prior addition of appropriate amounts of conductive fillers (such as carbon black, carbon fibers, carbon nanotubes, etc.) to the composition of the invention.

This component comprising the composition of the invention may also be used for storing or conveying a fluid as described above, and typically used in a stationary air conditioning circuit.

Other objectives and advantages of the present invention will emerge from a reading of the examples which follow, which are given as an indication and in no way as a limitation.

EXAMPLES

Formulation of the Compositions

The compositions tested were prepared from the following products:

11/10.T: semiaromatic polyamide, with a molar 11/10.T ratio of 0.7, obtained by polycondensation of 11-aminocarboxylic acid, 1,10-decanediamine, and terephthalic acid, having a glass transition temperature Tg of 88° C., a melting temperature Tf of 260° C., an intrinsic viscosity of 1.22 (measured according to standard ISO 307), and an enthalpy of fusion of 47 J/g PA11: homopolyamide obtained by the polycondensation of 11-amino-undecanedioic acid, comprising 100% biobased carbon, having a melting temperature of 185° C., an intrinsic viscosity of 1.0 to 1.6 dl/g (measured in accordance with standard ISO 307), and an enthalpy of fusion of 60 J/g Lotader AX8900: copolymer of ethylene, methyl acrylate, and glycidyl methacrylate (Et/MA/GMA-68/24/8 by weight), corresponding to product (A)

Lotader 4700: copolymer of ethylene, ethyl acrylate, and maleic anhydride (Et/EA/MAH-69/30/1 by weight), corresponding to product (B)

Lucalène 3110: copolymer of ethylene, butyl acrylate, and acrylic acid (Et/BA/AA-88/8/4 by weight), corresponding to product (C)

BBSA: n-butylbenzenesulfonamide (BBSA)

HP-BSA N-(2-hydroxypropyl)benzenesulfonamide (HP-BSA) sold by Proviron

Iodine 201: antioxidant additive based on KI and CuI

Naugard 445: 4,4'-bis(alpha,alpha-dimethylbenzyl)diphenylamine, which is an antioxidant additive Compositions 1 to 12 were all prepared on a twin-screw extruder, according to the formulations set out in detail in table 1 below.

Compositions 1, 2, and 4 to 12 are compositions in accordance with the invention, whereas composition 3 is a composition outside the invention.

Tests Conducted

The index of flow in the melt state, also called fluidity index or Melt Flow Index (MFI), was measured in accordance with standard ASTM D1238 at 300° C., under a weight of 5 kg, and the values reported in table 1.

Compositions 1 to 12 were extruded in the form of tubes with a diameter of 8 mm and a thickness of 1 mm (8*1 mm). The tubes thus extruded were subjected to the following tests:
- tubes were subjected to tensile tests in accordance with standard ISO 527 for determining the elongations at break;
- tubes were subjected to the impact test at −40° C. in accordance with the VW protocol drawn up by Volkswagen in accordance with standard TL 524 35. The percentage breakage is shown accordingly in table 1;
- tubes were aged in air at 170° C., then subjected to impact at −40° C. in accordance with standard DIN 74324. The half-life (in hours) was recorded accordingly, and corresponds to the time after which 50% of the tubes tested suffered breakage (see table 1).

Compositions 1 to 12 were injection molded in the form of bars, in accordance with standard ISO 179. These resulting bars were subsequently conditioned and kept for two weeks at 50% humidity. The bars were then subjected to the following tests:
- the flexural modulus of these bars was measured in accordance with standard ISO 178, and the values obtained have been reported in table 1.
- bars were notched and then tested in Charpy pendula impact in accordance with standard ISO 179-1 eA. The energy absorbed by the bars, expressed in $kJ/m^2$, was measured at 23° C. and −40° C., respectively, and the corresponding values have been reported in table 1 below.

1 to 4, 7, and 8 (which comprise BBSA), and no die drool for the extrusion of the tubes obtained from compositions 5, 6, and 9 to 12 (which comprise HP-BSA).

The selection of HP-BSA also allows improvement in the rheological properties of the compositions of the invention for conversion by extrusion.

It is observed, moreover, that all of the bars have a flexural modulus of less than 800 MPa, which characterizes high flexibility of the material.

More particularly, compositions 4 to 12 in accordance with the invention give materials which exhibit in combination:
- flexural modulus values of less than 600 MPA, therefore manifesting very great flexibility on the part of these materials,
- Charpy impact and VW impact values at −40° C. which are also very high, manifesting very high low-temperature impact strength of these materials,
- thermooxidative aging values of more than 850 hours, manifesting excellent aging resistance on the part of these materials.

Composition 3, which contains only 32% by weight of crosslinked polyolefin, relative to the total weight of the composition, does not perform as well as the compositions of the invention in terms of low-temperature impact strength (20% breakage in the VW impact test and 6 $kJ/m^2$ in Charpy impact, at −40° C.).

A comparison of examples 5 and 6 demonstrates the fact that an only slightly greater proportion of plasticizer, which, admittedly, allows a reduction in the flexural modulus of the corresponding materials, has a not insignificant effect on the low-temperature impact strength properties: the percentage breakage in the VW impact test at −40° C., accordingly, goes from 3 to 13, and the Charpy impact at −40° C. goes from 9 to 7.5 $kJ/m^2$.

TABLE 1

| Compositions | 1 | 2 | 3 | 4 | 5 | 6 | 7 | 8 | 9 | 10 | 11 | 12 |
|---|---|---|---|---|---|---|---|---|---|---|---|---|
| 11/10.T | 57.8 | 57.8 | 59.8 | 55.8 | 55.8 | 53.8 | 47.8 | 45.8 | 47.8 | 47.8 | 45.8 | 45.8 |
| (B) Lotader 4700 | 28 | 26 | 22 | 30 | 30 | 30 | 30 | 30 | 28 | 30 | 28 | 30 |
| (A) Lotader AX8900 | 4 | 5 | 5 | 6 | 6 | 6 | 6 | 6 | 4 | 6 | 4 | 6 |
| (C) Lucalène 3110 | 4 | 5 | 5 | | | | | | 4 | | 4 | |
| BBSA | 5 | 5 | 7 | 7 | | | 5 | 7 | | | | |
| HP-BSA | | | | | 7 | 9 | | | 5 | 5 | 7 | 7 |
| PA11 | | | | | | | 10 | 10 | 10 | 10 | 10 | 10 |
| Naugard 445 | 0.5 | 0.5 | 0.5 | 0.5 | 0.5 | 0.5 | 0.5 | 0.5 | 0.5 | 0.5 | 0.5 | 0.5 |
| Iodine 201 | 0.7 | 0.7 | 0.7 | 0.7 | 0.7 | 0.7 | 0.7 | 0.7 | 0.7 | 0.7 | 0.7 | 0.7 |
| MFI (g/10 min) | 2.8 | 2.3 | 4.1 | 1.55 | 3.52 | 4.39 | <1 | <1 | 4.09 | <1 | 4.6 | 1.17 |
| Tubes (8 × 1 mm) | | | | | | | | | | | | |
| Elongation at break | | | 151 | 132 | 142 | 158 | 150 | 136 | 183 | 133 | 170 | 166 |
| VW impact at −40° C. (% breakage) | | | 20 | 10 | 3 | 13 | 0 | 0 | 3 | 7 | 0 | 0 |
| Aging at 170° C. (½ life in h) | | | >850 | >850 | >850 | >850 | >850 | >850 | >850 | >850 | >850 | >850 |
| Bars | | | | | | | | | | | | |
| Flexural modulus (MPa) | 780 | 772 | 649 | 599 | 519 | 336 | 552 | 435 | 524 | 554 | 357 | 373 |
| Charpy impact +23° C. ($kJ/m^2$) | 70 | 66 | 72 | 78 | 76 | 88 | 81 | 82 | 79 | 82 | 86 | 86 |
| Charpy impact −40° C. ($kJ/m^2$) | 8 | 8 | 6 | 7 | 9 | 7.5 | 12 | 12 | 9 | 10 | 8 | 9.5 |

The appearance of the inner and outer surfaces of the tubes extruded from compositions 1 to 12 was examined, and it was observed that the surfaces of all of the extruded tubes are smooth and glossy. Moreover, during the extrusion step, no fumes could be observed to form. Examination of the extrusion die, moreover, showed very little formation of die drool during the extrusion of the tubes obtained from compositions The presence of PA11 in the compositions of the invention also allows improvement of the flexibility and low-temperature impact strength properties of materials obtained from said compositions (see compositions 4 and 8 on the one hand and compositions 5 and 12 on the other).

The component formed wholly or partly from the composition of the invention may more particularly be used for storing or conveying a fluid, said fluid being a refrigerant or refrigerating fluid such as $CO_2$ or a fluorocarbon fluid such as 1,1,1,2-tetrafluoroethane or 2,3,3,3-tetrafluoropropene. More particularly, it may be used in an air conditioning circuit, especially an automobile or truck air conditioning circuit, or else a stationary air conditioning circuit.

The invention claimed is:

1. A composition comprising—the weight percentages being given relative to the total weight of the composition—:
   from 33 to 40% by weight of at least one crosslinked polyolefin, the crosslinked polyolefin being obtained from:
   at least one product (A) comprising an unsaturated epoxide, and
   at least one product (B) comprising an unsaturated carboxylic anhydride,
   from 3 to 10% by weight of at least one plasticizer,
   the rest being made up of at least one semiaromatic polyamide,
   the weight amounts of (A) and (B), written respectively as [A] and [B], being such that the ratio [B]/[A] is between 3 and 14,
   wherein (A) is a polyolefin grafted with an unsaturated epoxide or a copolymer of an alpha olefin and an unsaturated epoxide, and (B) is a polyolefin grafted with an unsaturated carboxylic anhydride or a copolymer of an alpha olefin and an unsaturated carboxylic anhydride, at least one of A or B being a polyolefin.

2. The composition as claimed in claim 1, wherein the crosslinked polyolefin is obtained from the products (A), (B), and from at least one product (C) that is a copolymer of ethylene and (meth)acrylic acid, a copolymer of ethylene, an alkyl (meth)acrylate, and (meth)acrylic acid, or a polymer comprising an alpha,omega-aminocarboxylic acid unit, the weight amounts of (A), (B) and (C), written respectively as [A], [B] and [C], being such that $[C] \leq [A]$ and the ratio $[B]/([A]+[C])$ being between 1.5 and 8.

3. A process for preparing the composition as defined in claim 2, comprising melt-state mixing the semiaromatic polyamide(s), the plasticizer(s), and the products (A), (B) and (C) to obtain the crosslinked polyolefin(s).

4. The composition as claimed in claim 1, wherein the product (A) is a copolymer of ethylene, a saturated carboxylic acid vinyl ester, and an unsaturated epoxide, or a copolymer of ethylene, an alkyl (meth)acrylate, and an unsaturated epoxide.

5. The composition as claimed in claim 1, wherein the product (B) is a copolymer of ethylene, a saturated carboxylic acid vinyl ester, and an unsaturated carboxylic anhydride, or a copolymer of ethylene, an alkyl (meth)acrylate, and an unsaturated carboxylic anhydride.

6. The composition as claimed in claim 1, wherein the semiaromatic polyamide comprises at least one first semiaromatic repeating unit obtained from the polycondensation of a diamine and an aromatic dicarboxylic acid.

7. The composition as claimed in claim 6, wherein the semiaromatic polyamide comprises at least one second repeating unit selected from the group consisting of a unit obtained from an aminocarboxylic acid, a unit obtained from a lactam, and a unit conforming to the formula (Ca diamine).(Cb dicarboxylic acid), where a represents the number of carbon atoms in the diamine and b represents the number of carbon atoms in the dicarboxylic acid, said unit being different from the first repeating unit.

8. The composition as claimed in claim 7, wherein the semiaromatic polyamide comprises more than 50 mol % of first repeating unit(s).

9. The composition as claimed in claim 1, wherein the plasticizer is n-butylbenzenesulfonamide (BBSA) or N-(2-hydroxypropyl)benzenesulfonamide (HP-BSA).

10. The composition according to claim 9, wherein the plasticizer is HP-BSA.

11. The composition as claimed in claim 1, comprising at least one additive that is a stearate, a natural wax, a polymer comprising tetrafluoroethylene, a filler, a stabilizer, a dye, a mold release agent, a flame retardant, a surfactant, an optical brightener, or an antioxidant.

12. The composition as claimed in claim 1, wherein the composition comprises at least one additional polymer selected from the group consisting of a polyamide, a polyamide-block-ether, a polyetheramide, a polyesteramide, a polyphenylene sulfide, a polyphenylene oxide, a non-crosslinked polyolefin, and a fluoropolymer.

13. A process for preparing the composition as defined in claim 1, comprising melt-state mixing the semiaromatic polyamide(s), the plasticizer(s), the products (A), and (B), to obtain the crosslinked polyolefin(s).

14. A single-layer structure or at least one layer of a multilayer structure comprising the composition as defined in claim 1.

15. An extruded, coextruded or extrusion-blow molded component, formed entirely or partly from the composition as defined in claim 1.

16. A process for storing or conveying a fluid, comprising storing or transporting said fluid in a component according to claim 15, wherein said fluid is a fuel, a refrigerant or refrigerating fluid, a cooling liquid, a brake fluid, an oil, a lubricant, a hydraulic fluid, a urea solution, a gas or water.

17. The process as claimed in claim 16 for storing or conveying a fluid, said fluid being a refrigerant or refrigerating fluid.

18. The process as claimed in claim 16 wherein the component is employed in an air intake device or engine gas ventilation device, a braking assistance device, an oil cooling device, a hydraulic device, a braking device, an engine cooling device, a selective catalytic reduction device, an air conditioning circuit, or a fuel line.

19. The process as claimed in claim 18 wherein the component is employed in a stationary, automobile, or truck air conditioning circuit.

20. The composition according to claim 1, wherein the crosslinked polyolefin is present in an amount of 33-37% relative to the total weight of the composition and the ratio [B]/[A] is 4-9.

21. The composition according to claim 1, having a flexural modulus less than or equal to 800 MPa.

* * * * *